Sept. 6, 1932. M. WEINBERGER 1,875,901
SCREEN APPARATUS FOR AUTOMOBILE WINDOWS
Filed Aug. 7, 1929
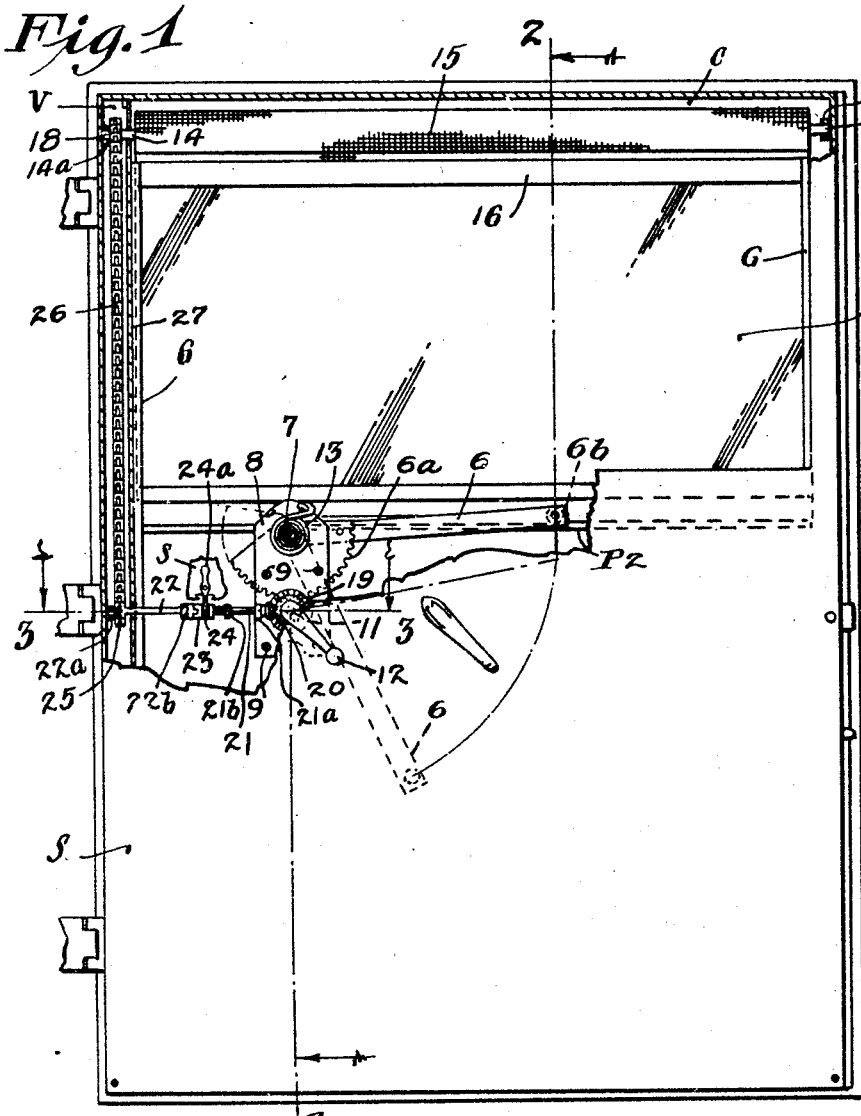

Patented Sept. 6, 1932

1,875,901

UNITED STATES PATENT OFFICE

MARTIN WEINBERGER, OF MINNEAPOLIS, MINNESOTA

SCREEN APPARATUS FOR AUTOMOBILE WINDOWS

Application filed August 7, 1929. Serial No. 384,197.

This invention relates to screen apparatus and especially to roller screen mechanism adapted for windows and doors of motor vehicles.

In warm weather, insects, dirt, small stones and a large amount of dust frequently get into the interior of automobiles through the windows and the sides of the bodies.

It is an object of my invention to provide a comparatively simple screen apparatus associated with the mechanism for raising the panes of automobile windows, whereby as the window is opened the opening will be automatically covered with flexible netting.

A further object is to provide roller screen apparatus for motor vehicles wherein a screen of the roller type is mounted in the upper portion of the window or door frame, the free edge of the screen being connected with the upper edge of the window pane and mechanism being supplied in association with the window pane operating device for positively rolling or unrolling the screen as the pane is moving upwardly or downwardly.

More specifically it is an object to provide roller screen apparatus driven by the short shaft, which in most motor vehicles operates the window raising mechanism to cause the screen to cover the opening as the window is lowered and to cause the screen to be rolled as the window is raised to closed position.

These and other objects and advantages of the invention will be apparent from the following description made in connection with the accompanying drawing, in which like reference characters refer to similar parts throughout the several views and in which, Fig. 1 is an inside elevation of a common type of automobile door with the usual window therein, and an embodiment of my invention applied thereto, some portions of said door being broken away to show working parts therewithin.

Fig. 2 is a vertical section taken on the line 2—2 of Fig. 1;

Fig. 3 is a horizontal section taken on the line 3—3 of Fig. 1;

Fig. 4 is a fragmentary view mostly in side elevation of the upper portion of an automobile door having a somewhat different form of my invention applied thereto;

Fig. 5 is a section taken on the line 5—5 of Fig. 4 showing the manner in which the lower edge of the netting is secured to the upper edge of the window pane and also showing the manner in which the netting and window pane is guided by the vertical sides of the door frame.

An automobile door of conventional type is shown in the drawing, comprising the usual door frame F, having the vertical sides and the horizontal top and bottom portions. The upper portion of said door frame constitutes the usual frame for the window and a vertically sliding pane P is mounted in a pair of vertical guides G attached to the vertical sides of the door frame in the usual manner. The inner and outer portions of the door are covered with suitable sheet material S, said sheet material forming with the door frame, below the window frame, a hollow compartment wherein the window pane operating mechanism is concealed.

In many types of automobiles now on the market, window operating mechanism, such as that disclosed in the drawing, is employed. An elongated arm 6 is pivoted at one end on a horizontal pivot pin 7, which passes transversely through the inner sheeting of the door and is mounted on a suitable plate or frame 8, said plate being attached by suitable means, such as screws 9 to the sheeting and cross members of the door. Arm 6 rigidly carries a gear segment 6a which, as shown, is approximately of 140°, and said gear segment is meshed with a small pinion 10 fixed to a stub shaft 11, which is suitably journaled in a boss 12 rigidly attached to plate 8. The outwardly projecting end of shaft 11 passes through the inner sheeting S of the door and has fixed thereto a suitable operating handle or crank 12. A coiled counterspring 13 is usually wound about the pivot 7 for arm 6, but since this spring has no function in the invention herein disclosed, detailed description thereof and of its function will be omitted. The outer end of window-raising arm 6 is provided with a laterally projecting pin or roller 6b which engages a track P² carried at the lower edge of the window pane.

In the form of the invention illustrated in Figs. 1 to 3, inclusive, I provide an elongated roll 14, which may be constructed from wood or metal as desired, and which has thereon any suitable means for attachment to one edge of a sheet of flexible netting of a type which may be easily rolled. The ends of roll 14 are suitably journaled in bearings 14a provided in the upper portions of the vertical members of the door frame F. The roll with the netting rolled thereon is entirely concealed and housed within the upper compartment or chamber C, which is provided in the top portion of most commercial automobile door frames. The screen netting 15, at its lower or free edge, is provided with a reinforcing strip 16, which has a grooved lower edge adapted to surround the upper edge of the window pane P. A compressible lining 16a is situated within the groove of the strip 16 and is adapted to bear against the upper edge of the window pane. It will be noted that the strip 16 is not fixedly connected to the upper edge of pane P but is merely mounted thereon.

One end of roll 14 (as shown the left end) has fixed thereon a sprocket 18, which is housed in the narrow vertical compartment formed at one side of the door frame. On the intermediate portion of window operating stub shaft 11, a beveled gear 19 is fixed, said gear meshing with a beveled gear 20 fixed to the inner end of a short shaft 21, which extends parallel with the window pane and substantially in horizontal alinement with shaft 11. Shaft 21 is suitably journaled in a bearing 21a, which is secured to plate 8, and in a second bearing 21b which is disposed within the hollow door structure below the window frame portion thereof. A screen-operating extension shaft 22 is journaled at its outer end in a bearing 22a provided in the left vertical side of the door frame and at its inner end in a bearing 22b similar to the bearing 21b previously described. The inner ends of shafts 21 and 22 are connected for driving engagement by means of a suitable clutch mechanism 23, the movable element of which is splined upon the inner end of shaft 21 and controlled by a suitable shipper fork 24 having a handle portion 24a disposed in the exterior of the inner sheeting S of the door. A sprocket 25 is fixed to the outer portion of screen operating shaft 22 and is housed in the vertical compartment V at the left side of the door frame. An endless chain 26 is trained about the driving sprocket 25 and the sprocket 18 connected with roll 14, said chain extending substantially vertically and being also housed in the vertical compartment V at one side of the door. Detachable vertical strips 27 define the inner sides of compartment V and the sides of the window frame on which the guides G are mounted and a detachable strip 28 having a longitudinally extending slot therethrough to permit passage of the netting is provided in the upper portion of the door frame and defines the inner side of compartment C in which the screen roll is housed. It will be apparent that the parts may be easily assembled when the said strips are removed.

*Operation*

In Fig. 1 the upper position of the window frame operating bar is shown in full lines, while the extreme lower position is shown in dotted lines and the arc of its swing is shown by dotted and broken lines. Assuming the window in raised position, as illustrated in the drawing, when the handle 12 is turned to lower the window pane, assuming clutch mechanism 23 to be operatively connected for driving shaft 22, the roll 14 will be driven to unwind or pay out the flexible netting. The netting has enough rigidity to cause the tendency of the same to follow downwardly along the guides G as it is unwound and, of course, as the grooved strip 16 bears against the upper edge of pane P and is confined thereby, the netting 15 will move downwardly with the pane. When the crank or handle 12 is turned in clockwise direction, endless chain 26 will be moved oppositely, causing roll 14 to wind the netting as the window pane is raised.

It will be noticed that since window operating arm 6 passes through an arc, that the linear movement of the window pane, assuming the crank 12 to be turned at a constant speed, will be very slightly accelerated, as it approaches the raised position. It will also be noticed that due to the fact that the netting is wound about roll 14, each successive turn of the roll will wind a slightly larger amount of the netting. By making the roll of the proper size, the acceleration of the winding thereon will precisely compensate for the slight acceleration in the raising of the pane as arm 6 approaches the extreme upward and substantially horizontal position.

When the window is fully raised, the entire netting will be hidden and only the strip 16 will be seen. If it is desired to open the window without screening the aperture, shipper lever 24 need only be thrown to disconnect clutch elements 23, whereby the window pane will be raised or lowered without affecting the screening mechanism, inasmuch as the strip 16 is not fixed to the upper edge of the pane.

In the drawing, the device is shown applied to a common type of automobile door, but it is, of course, perfectly apparent that my device is equally applicable to similar window raising mechanisms for the rear windows of automobile bodies, or for window raising mechanisms of the type disclosed wherever used.

In Figs. 4 and 5 of the drawing, I have illustrated a different and more simplified form of my invention. Fig. 4 shows the upper portion of a standard automobile door and in the compartment formed in the upper portion of said door a spring-controlled roller 30, of the type used in window curtains, is mounted, one end being journaled in one of the vertical sides of the door frame, while the opposite end 30a is held against rotation by engagement with an oblong-shaped socket. The roller is not provided with the usual retaining dog for holding the roller against winding, but the influence of the spring is always exerted on the roller to guide the same. Suitable flexible netting 31 is rolled upon roller 30, one edge of said netting being secured to the roller, while the lower edge of netting 31 is provided with a strip 32 similar to the strip 16 used in connection with the form of my invention first described. The strip 32 is of inverted U-shape in cross section and has situated therein a liner 32a formed from light metal or similar compressible material and set screw clamping elements 33 are screw threaded in the inner side of the strip 32 and bear against one side of the liner 32a. The upper edge of the pane P fits within the liner 32a and the lower edge of the netting 31 is fixedly but releasably secured to the upper edge of the pane P by tightening the clamping elements 33 against the liner 32a. Window pane P is raised or lowered by the usual window-operating mechanism illustrated in Fig. 1.

In this last mentioned form of the invention, the screening or netting is operated by the cooperation of the spring roller and the movement of the window pane. When the window pane moves upwardly, the spring roller takes up the slack in the netting and when the window pane is moved downwardly through the connection with the lower edge of the netting, it pulls the netting downwardly against the tension of the spring, thereby covering the opening.

From the foregoing descriptions, it will be seen that I have invented a comparatively simple, but efficient apparatus for adequately screening automobile windows, which apparatus is automatically controlled by the operation of the window-operating mechanism.

It will, of course, be understood that various changes may be made in the form, details, arrangement and proportions of the parts without departing from the scope of applicant's invention.

What is claimed is:

1. In combination with a window frame having opposed parallel guides and a window slidable longitudinally in said guides, a window raising element mounted for swinging movement in such manner that the ratio of the angular movement thereof to the lineal movement of the window increases as the window approaches closed position, a flexible screen also slidably mounted in said guides, a screen roller mounted transversely at the ends of said guides for spirally winding said screen, a rotary operating member and driving connections between said operating member and said roller and between said operating member and said window raising element or arm so constructed and arranged that said ratio increases directly and equally to the ratio of the same angular movement of said raising element to the lineal movement of the lower edge of the flexible screen.

2. In operating mechanism of the class described, a pair of opposed parallel guides, a screen roller mounted transversely across the ends of said guides, a flexible screen mounted in said guides and attached to said roller for spiral winding thereon, a window slidable longitudinally in said guides, a window-raising element mounted for swinging movement in such manner that it will extend substantially parallel to the bottom of said window when the window is in closed position whereby the ratio of the angular movement of said element to the lineal movement of the window increases as the window approaches closed position and a common driving means or handle for actuating both said window-raising element and said screen roller so connected for driving with said last mentioned elements that the said ratio increases directly and equally to the ratio of the same angular movement of the window-raising element to the lineal movement of the lower edge of the flexible screen.

In testimony whereof I affix my signature.

MARTIN WEINBERGER.